United States Patent
Sasaki

(10) Patent No.: US 9,576,143 B2
(45) Date of Patent: Feb. 21, 2017

(54) INFORMATION PROCESSING APPARATUS, INFORMATION PROCESSING METHOD, AND COMPUTER-READABLE MEDIUM

(71) Applicant: FUJI XEROX CO., LTD., Minato-ku, Tokyo (JP)

(72) Inventor: Takanao Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 36 days.

(21) Appl. No.: 14/257,606

(22) Filed: Apr. 21, 2014

(65) Prior Publication Data
US 2015/0042685 A1 Feb. 12, 2015

(30) Foreign Application Priority Data
Aug. 12, 2013 (JP) .................................. 2013-167236

(51) Int. Cl.
G06F 21/62 (2013.01)
G06F 21/60 (2013.01)
G06F 1/16 (2006.01)

(52) U.S. Cl.
CPC .......... G06F 21/6218 (2013.01); G06F 21/60 (2013.01); *G06F 1/1626* (2013.01); *G06F 2221/2149* (2013.01)

(58) Field of Classification Search
CPC ............... G09G 2340/0492; G06F 2200/1614; G06F 1/1626; G06F 21/60; H04N 1/10
See application file for complete search history.

(56) References Cited

U.S. PATENT DOCUMENTS

| 2003/0025603 | A1 | 2/2003 | Smith | |
|---|---|---|---|---|
| 2005/0212764 | A1 | 9/2005 | Toba | |
| 2009/0295832 | A1 | 12/2009 | Takatsuka et al. | |
| 2012/0299964 | A1 | 11/2012 | Homma et al. | |
| 2013/0205387 | A1* | 8/2013 | Le | G06F 21/316 726/19 |
| 2015/0371079 | A1* | 12/2015 | Kohlenberg | G06F 21/31 348/77 |

FOREIGN PATENT DOCUMENTS

| JP | 2005277452 A | 10/2005 |
|---|---|---|
| JP | 2009-130816 A | 6/2009 |

(Continued)

OTHER PUBLICATIONS

Patel, Shwetak N., Jeffrey S. Pierce, and Gregory D. Abowd. "A gesture-based authentication scheme for untrusted public terminals." Proceedings of the 17th annual ACM symposium on User interface software and technology. ACM, 2004.*

*Primary Examiner* — Sarah Le
(74) *Attorney, Agent, or Firm* — Sughrue Mion, PLLC

(57) ABSTRACT

An information processing apparatus includes a determination unit, an operator change unit, and an image change unit. The determination unit determines whether or not an image displayed on a display unit of a portable information processing apparatus has been rotated. The operator change unit changes an operator of the information processing apparatus, when the determination unit determines that the image has been rotated. The image change unit changes the image displayed on the display unit of the information processing apparatus on the basis of the operator who has been changed by the operator change unit.

9 Claims, 6 Drawing Sheets

(56) References Cited

FOREIGN PATENT DOCUMENTS

| | | | |
|---|---|---|---|
| JP | 2009-289039 | A | 12/2009 |
| JP | 2009-294728 | A | 12/2009 |
| JP | 2010-262454 | A | 11/2010 |
| JP | 2012247959 | A | 12/2012 |
| JP | 201398875 | A | 5/2013 |

* cited by examiner

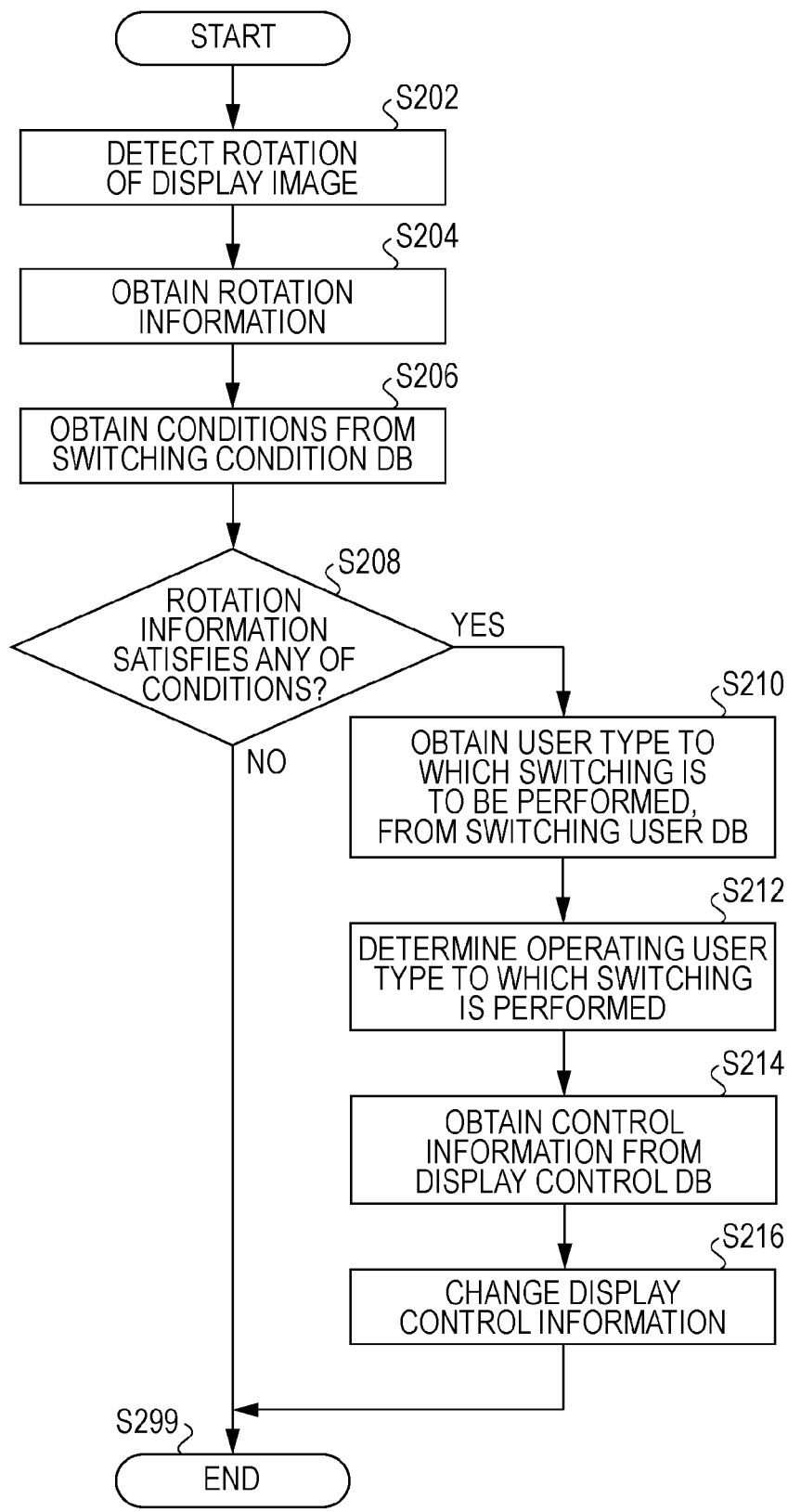

FIG. 3

| TARGET | CONDITIONAL EXPRESSION |
|---|---|
| ANGLE | ≥ 180 |

FIG. 4

| OPERATING USER TYPE | TARGET | CONDITION |
|---|---|---|
| TEMPORARY USER | OPERATION INTERVAL | LESS THAN FIVE MINUTES |
| INVALID USER | OPERATION INTERVAL | EQUAL TO OR MORE THAN FIVE MINUTES |

FIG. 5

| OPERATING USER TYPE | ACCESS RIGHT LEVEL |
|---|---|
| TEMPORARY USER | PERMISSION TO USE ONLY APPLICATION WHICH IS BEING DISPLAYED |
| INVALID USER | PERMISSION TO USE ONLY AUTHENTICATION PROCESS | ions # INFORMATION PROCESSING APPARATUS, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-167236 filed Aug. 12, 2013.

BACKGROUND

The present invention relates to an information processing apparatus, an information processing method, and a computer-readable medium.

SUMMARY

According to an aspect of the invention, there is provided an information processing apparatus including a determination unit, an operator change unit, and an image change unit. The determination unit determines whether or not an image displayed on a display unit of the information processing apparatus has been rotated, the information processing apparatus being portable. The operator change unit changes an operator of the information processing apparatus, when the determination unit determines that the image has been rotated. The image change unit changes the image displayed on the display unit of the information processing apparatus on the basis of the operator who has been changed by the operator change unit.

BRIEF DESCRIPTION OF THE DRAWINGS

Exemplary embodiments of the present invention will be described in detail based on the following figures, wherein:

FIG. 2 is a flowchart of an exemplary process according to the first exemplary embodiment;

FIG. 3 is a diagram for describing an exemplary data structure of a switching condition table;

FIG. 4 is a diagram for describing an exemplary data structure of a user control table;

FIG. 5 is a diagram for describing an exemplary data structure of a display control table;

DETAILED DESCRIPTION

Before description of exemplary embodiments, a technique on which exemplary embodiments are predicated will be described. This description aims to facilitate understanding of the exemplary embodiments.

For example, slate devices and the like may be used to handle business documents, for example, in an in-company task, in a demonstration taking place outside an office, or in a joint project carried out by several companies.

However, giving a slate device or the like to all employees is actually difficult from the viewpoint of cost. Therefore, a slate device or the like is often shared by several persons or the members in a team, and the single terminal is operated by several persons.

In the case where a slate device or the like of the related art is used, for example, when a document in such a slate device or the like is to be authorized on the spot by a partner (a boss or a member of a joint project), logout and login operations are performed on the shared slate device or the like so that the operating user is changed from the authorization requester to the authorizer. Then, the document to be authorized has to be retrieved again. These operations are troublesome. In addition, there is a problem from the viewpoint of security in giving the slate device to the partner without changing the operating user.

The various exemplary embodiments which are preferable to embody the present invention will be described below on the basis of the drawings.

Figure 1:
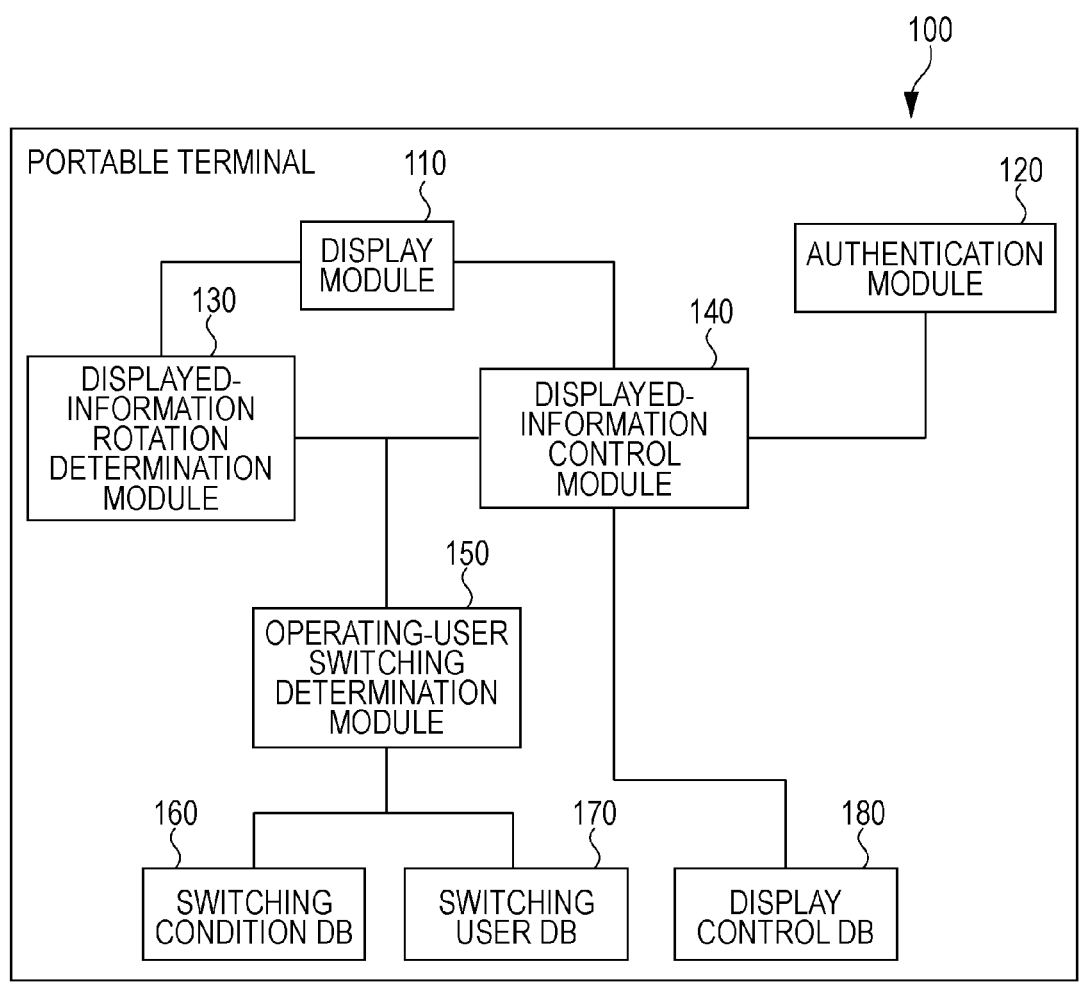
FIG. 1 is a conceptual diagram illustrating an exemplary module configuration according to a first exemplary embodiment.

FIG. 1 is a conceptual diagram illustrating an exemplary module configuration according to a first exemplary embodiment.

In general, a module refers to a component, such as software that is logically separable (a computer program) or hardware. Thus, a module in the exemplary embodiment refers to not only a module in terms of a computer program but also a module in terms of a hardware configuration. Consequently, the description of the exemplary embodiment serves as the description of a system, a method, and a computer program which cause the hardware configuration to function as a module (a program that causes a computer to execute procedures, a program that causes a computer to function as units, or a program that causes a computer to implement functions). For convenience of explanation, the terms "to store something" and "to cause something to store something", and equivalent terms are used. These terms mean that a storage apparatus stores something or that a storage apparatus is controlled so as to store something, when computer programs are used in the exemplary embodiment. One module may correspond to one function. However, in the implementation, one module may constitute one program, or multiple modules may constitute one program. Alternatively, multiple programs may constitute one module. Additionally, multiple modules may be executed by one computer, or one module may be executed by multiple computers in a distributed or parallel processing environment. One module may include another module. Hereinafter, the term "connect" refers to logical connection, such as transmission/reception of data, an instruction, or reference relationship between pieces of data, as well as physical connection. The term "predetermined" refers to a state in which determination has been made before a target process. This term also includes a meaning in which determination has been made in accordance with the situation or the state at that time or before that time, not only before processes according to the exemplary embodiment start, but also before the target process starts even after the processes according to the exemplary embodiment have started. When multiple "predetermined values" are present, these may be different from each other, or two or more of the values (including all values, of course) may be the same. A description having a meaning of "when A is satisfied, B is performed" is used as a meaning in which whether or not A is satisfied is determined and, when it is determined that A is satisfied, B is performed. However, this term does not include a case where the determination of whether or not A is satisfied is unnecessary.

A system or an apparatus refers to one in which multiple computers, pieces of hardware, devices, and the like are connected to each other by using a communication unit such as a network which includes one-to-one communication connection, and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (social system) which is constituted by man-made agreements.

In each of the processes corresponding to modules, or in each of the processes included in a module, target information is read out from a storage apparatus. After the process is performed, the processing result is written in a storage apparatus. Accordingly, no description about the reading of data from the storage apparatus before the process and the writing into the storage apparatus after the process may be made. Examples of the storage apparatus may include a hard disk, a random access memory (RAM), an external storage medium, a storage apparatus via a communication line, and a register in a central processing unit (CPU).

A portable terminal 100 according to the first exemplary embodiment includes a display screen, and is portable. As illustrated in the example in FIG. 1, the portable terminal 100 includes a display module 110, an authentication module 120, a displayed-information rotation determination module 130, a displayed-information control module 140, an operating-user switching determination module 150, a switching condition DB 160, a switching user DB 170, and a display control DB 180.

The "display screen" is, for example, a display apparatus such as a liquid crystal display, and may be a touch panel or the like. The term "portable" means that an operator may rotate the screen of the portable terminal 100, and the rotation encompasses both of rotation of only the screen of the portable terminal 100 and rotation of the screen by rotating the entire portable terminal 100. Examples of such a device include a tablet, a slate device, a cellular telephone (including a smartphone), and a note-type personal computer (PC), regardless of whether or not a physical keyboard is included.

The display module 110 is connected to the displayed-information rotation determination module 130 and the displayed-information control module 140. The display module 110 displays information which the displayed-information control module 140 permits to be displayed, to the operating user on the screen of the portable terminal 100.

The authentication module 120 is connected to the displayed-information control module 140. The authentication module 120 requests input of authentication information in response to an explicit authentication change request from the operating user. When the authentication information is valid, the authentication module 120 changes the operating user. Specifically, the authentication module 120 requests the operating user to input a user ID and a password, and determines whether or not the combination of the user ID and the password which have been input is valid.

The displayed-information rotation determination module 130 is connected to the display module 110, the displayed-information control module 140, and the operating-user switching determination module 150. The displayed-information rotation determination module 130 checks rotation of the image displayed on the screen by the display module 110. That is, the displayed-information rotation determination module 130 monitors the orientation of the image displayed on the screen of the portable terminal 100. When the orientation of the display image is changed (rotated), the displayed-information rotation determination module 130 obtains the rotation information, and transmits the check result to the operating-user switching determination module 150.

The image displayed on the screen of the portable terminal 100 is subjected to a rotation process in which the operating user explicitly transmits an instruction to rotate the image, or to a rotation process in which the image is rotated in accordance with rotation of the portable terminal 100 itself. The rotation process may be performed by the operating system (OS) or an application installed in the portable terminal 100.

For example, the displayed-information rotation determination module 130 checks the orientation of the image displayed on the portable terminal 100 in real time. When the orientation of the screen is changed, the displayed-information rotation determination module 130 obtains information about the difference (angles and/or an operation interval) between the states before and after the change, as the rotation information.

Examples of the rotation information include "an angular change by 180° which is made when two minutes have elapsed after the previous rotation".

The operating-user switching determination module 150 is connected to the displayed-information rotation determination module 130, the displayed-information control module 140, the switching condition DB 160, and the switching user DB 170. When the displayed-information rotation determination module 130 determines that the image is rotated, the operating-user switching determination module 150 changes the operator of the portable terminal 100 (hereinafter, who may be also referred to as the operating user). Specifically, in accordance with the determination result from the displayed-information rotation determination module 130, when the rotation information satisfies a condition registered in the switching condition DB 160, the operating-user switching determination module 150 determines that the operating user is to be switched, and instructs the displayed-information control module 140 to change the display. The change of the operating user encompasses addition of a new operating user, switching from an operating user A who has operated the portable terminal 100 before the rotation to an operating user B, and deleting (logout) of an operating user who has operated the portable terminal 100 before the rotation.

For example, the operating-user switching determination module 150 compares the rotation information obtained from the displayed-information rotation determination module 130 with information (a switching condition table 300 described below) obtained from the switching condition DB 160. In the case of the above-described rotation information "an angular change by 180° which is made when two minutes have elapsed after the previous rotation", the operating-user switching determination module 150 determines that switching of the operating user is to be performed. Then, the operating-user switching determination module 150 obtains operating-user type information corresponding to the operation interval (two minutes after the previous operation). In the above-described example, since the angle is changed by 180° or more when five minutes or less have elapsed after the previous operation, the operating-user switching determination module 150 instructs the displayed-information control module 140 to exert control in which the operating user after the switching is regarded as having the type "TEMPORARY USER".

The operating-user switching determination module 150 may control the authentication module 120 so that the operator is changed through authentication of the operator. That is, the user is switched through manual authentication. This process may be performed when the user is determined to have the type "INVALID USER" described below.

The operating-user switching determination module 150 causes the authentication module 120 to display an authentication screen on the display screen of the portable terminal 100. When the authentication information which is input matches user information stored in the portable terminal 100, control is exerted on the user regarded as the operating user. In the case where the portable terminal 100 operates with Active Directory (AD), the displayed-information control module 140 may check the access right level of the operating user from AD.

The displayed-information control module 140 is connected to the display module 110, the authentication module 120, the displayed-information rotation determination module 130, the operating-user switching determination module 150, and the display control DB 180. The displayed-information control module 140 changes the image displayed on the screen of the portable terminal 100 on the basis of the operator changed by the operating-user switching determination module 150. The displayed-information control module 140 controls information displayed on the portable terminal 100 in accordance with an operation performed by the operating user. Examples of the image displayed on the screen of the portable terminal 100 include a display screen generated by an application program, and an electronic document. Examples of the image content include personal information and a document which needs authorization. Whether or not personal information of the operating user before the rotation is displayed may be determined. When such personal information is displayed, the personal information may be deleted.

For example, the displayed-information control module 140 obtains the access right level of the specified operating user from the display control DB 180. The display is changed in accordance with the obtained access right level, and an operation performed by the operating user is controlled. In the above-described example, since the operating user is changed to a "TEMPORARY USER", only the application which is being displayed is allowed to be displayed and used. When the operating user is changed to an "INVALID USER", a manual authentication process is performed. When the authentication succeeds, the operating user may be changed to the user who has been authenticated.

The switching condition DB 160 is connected to the operating-user switching determination module 150. The switching condition DB 160 stores condition information (definition) which is required when the operating-user switching determination module 150 determines whether or not the operating user is to be switched. For example, the switching condition DB 160 stores the switching condition table 300. FIG. 3 is a diagram for describing an exemplary data structure of the switching condition table 300. The switching condition table 300 includes a target column 310 and a conditional expression column 320. The target column 310 stores a determination target on which determination is performed. For example, the target is a rotation angle. The conditional expression column 320 stores a condition which is described by using the determination target and with which determination as to whether or not the operating user is to be switched is made. For example, the condition is that, when the rotation angle is 180° or more, the operating user is to be switched. In the case where the rotation direction is taken into consideration, the condition is that, when the rotation angle ranges from −180° to +180°, the operating user is to be switched. As a matter of course, when the rotation angle is a multiple of 90°, the operating user may be switched.

The switching user DB 170 is connected to the operating-user switching determination module 150. The switching user DB 170 stores information which describes a user type to be changed and a condition (definition) for the change which are used in the operating-user change determination performed by the operating-user switching determination module 150. For example, the switching user DB 170 stores a user control table 400. FIG. 4 is a diagram for describing an exemplary data structure of the user control table 400. The user control table 400 includes an operating user type column 410, a target column 420, and a condition column 430. The operating user type column 410 stores a type for the operating user after the switching. Examples of data in the operating user type column 410 include "TEMPORARY USER" and "INVALID USER". The permission for "TEMPORARY USER" and "INVALID USER" will be described below by using the example in FIG. 5. The target column 420 stores a target of the condition for switching to a corresponding operating user type. Examples of data in the target column 420 include "OPERATION INTERVAL" which means an interval from a time when an operation performed by the operating user is received to a time when a rotation operation is performed. More specifically, "OPERATION INTERVAL" means an operation interval from a time when an operation of opening a document is performed to a time when a rotation operation is performed. The condition column 430 stores a condition for switching to a corresponding operating user type. For example, when an operation interval satisfies the condition "LESS THAN FIVE MINUTES", the operating user is switched to a temporary user. When an operation interval satisfies the condition "EQUAL TO OR MORE THAN FIVE MINUTES", the operating user is switched to an invalid user.

Other than these, for example, in the case where the target is "POSITION OF THE PORTABLE TERMINAL 100" and where the condition is "IN THE PREDETERMINED LOCATION (FOR EXAMPLE, IN THE COMPANY)", the operating user may be regarded as "TEMPORARY USER". In the case where the target is "POSITION OF THE PORTABLE TERMINAL 100" and where the condition is "NOT IN THE PREDETERMINED LOCATION (FOR EXAMPLE, NOT IN THE COMPANY)", the operating user may be regarded as "INVALID USER". The position of the portable terminal 100 may be detected by using the output (the latitude and the longitude) from the global positioning system (GPS) included in the portable terminal 100. Whether or not the location is a predetermined one is determined as follows. The latitude and the longitude of the location are measured in advance. When the output from the GPS is in a predetermined area, the location is determined to be a predetermined location. Other than the GPS, the position of a relay apparatus in the communication may be used.

In the example in FIG. 4, only one combination of a target and a condition is described. Alternatively, more than one combination may be described. As described above, a combination of an operation interval and a condition about the position of the portable terminal 100 may be combined (for example, by using AND and/or OR).

The display control DB 180 is connected to the displayed-information control module 140. The display control DB 180 stores a control level (definition) for the operating user after switching. For example, the display control DB 180 stores a display control table 500. FIG. 5 is a diagram for describing an exemplary data structure of the display control table 500. The display control table 500 includes an operating user type column 510 and an access right level column 520. The operating user type column 510 stores an operating user type. The access right level column 520 stores the access right level of the operating user type. For example, for "TEMPORARY USER", "PERMISSION TO USE ONLY APPLICATION WHICH IS BEING DISPLAYED" is stored. For "INVALID USER", "PERMISSION TO USE ONLY AUTHENTICATION PROCESS" (which means that the portable terminal 100 is permitted to be operated only after an authentication process performed by the authentication module 120 is completed) is stored.

FIG. 2 is a flowchart of an exemplary process according to the first exemplary embodiment.

In step S202, the displayed-information rotation determination module 130 detects rotation of the display image. That is, the displayed-information rotation determination module 130 which monitors rotation of the display image determines the state of the rotation of the display image. When the display image is rotated, the process starts. For example, when the display image is rotated, an interrupt may be generated, and the process may start.

In step S204, the displayed-information rotation determination module 130 obtains rotation information. That is, the displayed-information rotation determination module 130 obtains the rotation information of the display image, such as an angle of the rotation, and the process is then transferred to the operating-user switching determination module 150.

In step S206, the operating-user switching determination module 150 obtains conditions from the switching condition DB 160.

In step S208, the operating-user switching determination module 150 determines whether or not the rotation information satisfies any of the conditions. If the rotation information satisfies any of the conditions, the process proceeds to step S210. Otherwise, the process ends (in step S299). That is, the operating-user switching determination module 150 compares the rotation information obtained from the displayed-information rotation determination module 130 with the definitions of operating-user switching determination conditions stored in the switching condition DB 160, and performs a determination process.

In step S210, the operating-user switching determination module 150 obtains a user type to which switching is to be performed, from the switching user DB 170. That is, if the result of the determination process in step S206 is that any of the conditions is satisfied, the operating-user switching determination module 150 determines that the operating user is temporarily switched, and obtains operating-user type information corresponding to the satisfied condition from the switching user DB 170.

In step S212, the operating-user switching determination module 150 performs a switching user determination process. That is, the operating-user switching determination module 150 determines the operating user type to which the switching is to be performed, and causes the displayed-information control module 140 to switch the operating user.

In step S214, the displayed-information control module 140 obtains control information from the display control DB 180. That is, the displayed-information control module 140 obtains the control information which is set in the display control DB 180, on the basis of the information obtained from the operating-user switching determination module 150.

In step S216, the displayed-information control module 140 changes the display control information. That is, the displayed-information control module 140 changes the display control in accordance with the control information obtained from the display control DB 180, and restricts some operations performed by the operating user after the display control is changed.

Figure 6:
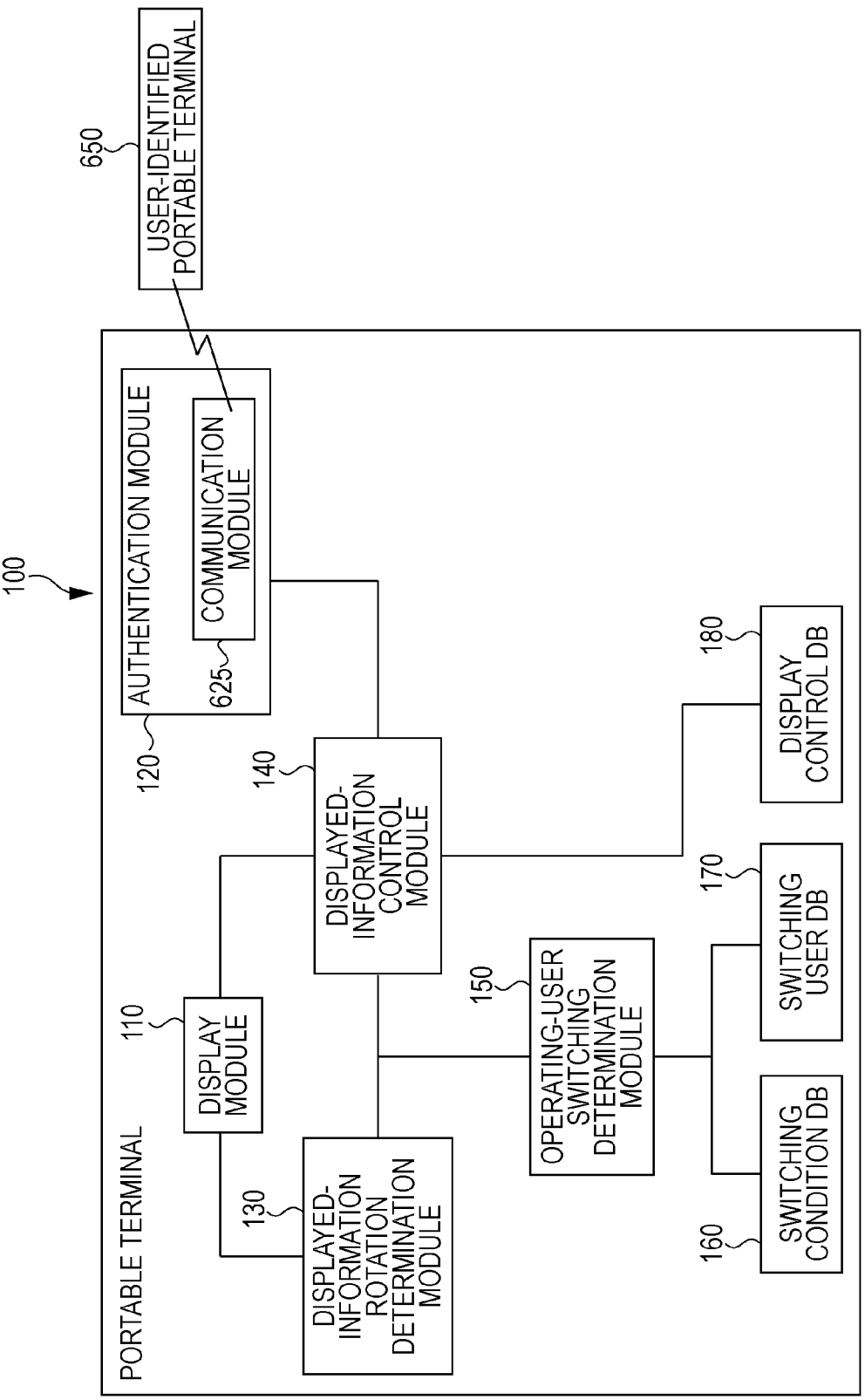
FIG. 6 is a conceptual diagram illustrating an exemplary module configuration according to a second exemplary embodiment.

FIG. 6 is a conceptual diagram illustrating an exemplary module configuration according to a second exemplary embodiment. Components of the same type as that in the first exemplary embodiment are designated with identical reference numerals, and will not be described (the same hereinafter). The authentication module 120 includes a communication module 625. The communication module 625 is connected to a user-identified portable terminal 650 through wireless communication.

It is assumed that users each carry a user-identified portable terminal 650 storing the user identification information with which the user is uniquely identifiable in the second exemplary embodiment. The users may include those different from the operating user before the rotation, and may also include the operating user before the rotation (the operating user of the portable terminal 100).

The communication module 625 measures the distance between the portable terminal 100 and the communication apparatus carried by an operator by means of wireless communication. The value of the distance which is measured may be a measurement distance which is concrete, or a value which represents the degree of the distance. For example, the communication module 625 uses infrared-ray communication of the portable terminal 100 or a received signal strength indicator (RSSI) function performed by Bluetooth™ or the like to communicate with user-identified portable terminals 650 which are present near the portable terminal 100, and obtains user identification information included in each of the user-identified portable terminals 650.

The operating-user switching determination module 150 changes the operator on the basis of the distance measured by the communication module 625. Specifically, the user who is present at the shortest distance from the portable terminal 100 is determined to be the operating user after the rotation (the user to whom the switching is to be performed). As a matter of course, the user is identified by using the user identification information included in the user-identified portable terminal 650 carried by a user other than the operating user of the portable terminal 100.

In the case where the portable terminal 100 operates with AD, the displayed-information control module 140 may check the access right level of the operating user from AD.

Figure 7:
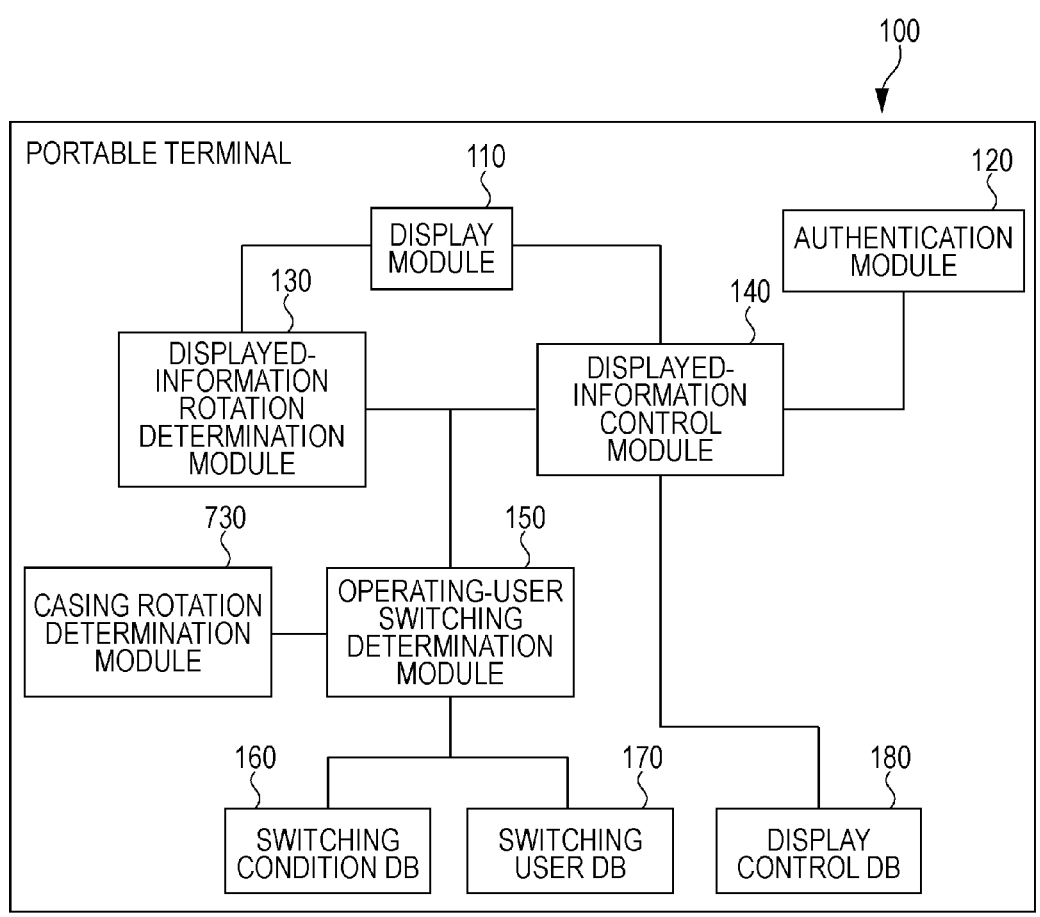
FIG. 7 is a conceptual diagram illustrating an exemplary module configuration according to a third exemplary embodiment.

FIG. 7 is a conceptual diagram illustrating an exemplary module configuration according to a third exemplary embodiment. The portable terminal 100 includes the display module 110, the authentication module 120, the displayed-information rotation determination module 130, the displayed-information control module 140, the operating-user switching determination module 150, the switching condition DB 160, the switching user DB 170, the display control DB 180, and a casing rotation determination module 730. The operating-user switching determination module 150 is connected to the displayed-information rotation determination module 130, the displayed-information control module 140, the switching condition DB 160, the switching user DB 170, and the casing rotation determination module 730.

The casing rotation determination module 730 is connected to the operating-user switching determination module 150. The casing rotation determination module 730 detects rotation of the portable terminal 100. Rotation may be detected by performing an existing process using the output from a direction sensor, a gravity sensor, or the like included in the portable terminal 100 (such as the orientation or an angle of the portable terminal 100).

In the case where the casing rotation determination module 730 detects rotation of the portable terminal 100 or where the displayed-information rotation determination module 130 detects rotation of the image, the operating-user switching determination module 150 changes the operator of the portable terminal 100. The expression "in the case where the casing rotation determination module 730 detects rotation of the portable terminal 100 or where the displayed-information rotation determination module 130 detects rotation of the image" means that the former case or the latter case may occur, or that the former case and the latter case may occur.

Figure 8:
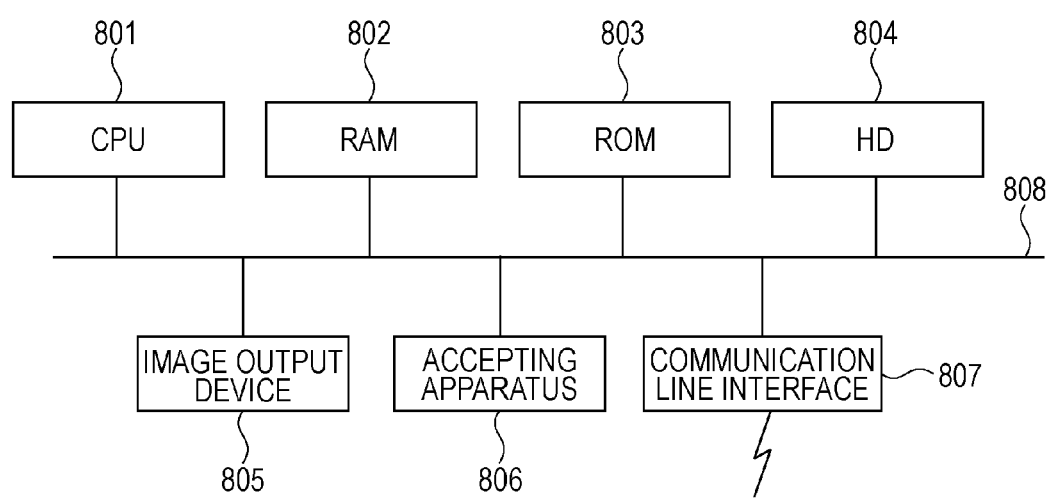
FIG. 8 is a block diagram illustrating an exemplary hardware configuration of a computer for achieving the exemplary embodiments.

As illustrated in FIG. 8, the hardware configuration of a computer in which programs achieving the exemplary embodiments are executed constitutes a portable computer, and specifically, constitutes a computer or the like which may serve as a tablet personal computer. That is, the exemplary configuration employs a CPU 801 as a processor (arithmetic logical unit), and employs a RAM 802, a read-only memory (ROM) 803, and an HD 804 as storage devices. For example, a hard disk may be used as the HD 804. The computer includes the following components: the CPU 801 which executes programs, such as the display module 110, the authentication module 120, the displayed-information rotation determination module 130, the displayed-information control module 140, the operating-user switching determination module 150, the communication module 625, the casing rotation determination module 730, and the like; the RAM 802 which stores the programs and data; the ROM 803 which stores programs and the like for starting the computer; the HD 804 which is an auxiliary memory (which may be a flash memory or the like); an accepting apparatus 806 which accepts data on the basis of an operation performed by a user on a keyboard, a mouse, a touch panel, or the like; an image output device 805 such as a liquid crystal display; a communication line interface 807 for establishing connection to a communication network (which is mainly wireless communication, but may be wired communication), such as a network interface card; and a bus 808 for connecting the above-described components to each other and receiving/transmitting data. Computers having this configuration may be connected to one another via a network.

In the case where the above-described exemplary embodiments are achieved by using computer programs, computer programs which are software are read into a system having the hardware configuration, and the software and the hardware resources cooperate with each other to achieve the above-described exemplary embodiments.

The hardware configuration in FIG. 8 is merely one exemplary configuration. The exemplary embodiment is not limited to the configuration in FIG. 8, and may have any configuration as long as the modules described in the exemplary embodiments may be executed. For example, some modules may be constituted by dedicated hardware, such as an application-specific integrated circuit (ASIC), and some modules which are installed in an external system may be connected through a communication line. In addition, systems having the configuration illustrated in FIG. 8 may be connected to one another through communication lines and may cooperate with one another.

The various exemplary embodiments described above may be combined (for example, including the case in which a module in one exemplary embodiment is added to another exemplary embodiment or is replaced with a module of another exemplary embodiment). Alternatively, a technique of the related art may be employed as information about processing of the modules.

The programs described above may be provided through a recording medium which stores the programs, or may be provided through a communication unit. In these cases, for example, the programs described above may be interpreted as an invention of "a computer-readable recording medium that stores programs".

The term "a computer-readable recording medium that stores programs" refers to a computer-readable recording medium that stores programs and that is used for, for example, the installation and execution of the programs and the distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray® Disk, a magneto-optical disk (MO), a flexible disk (FD), a magnetic tape, a hard disk, a ROM, an electrically erasable programmable ROM (EEPROM®), a flash memory, a RAM, and a secure digital (SD) memory card.

The above-described programs or some of them may be stored and distributed by recording them on the recording medium. In addition, the programs may be transmitted through communication, for example, by using a transmission medium of, for example, a wired network which is used for a local area network (LAN), a metropolitan area network (MAN), a wide area network (WAN), the Internet, an intranet, an extranet, and the like, a wireless communication network, or a combination of these. Instead, the programs may be carried on carrier waves.

The above-described programs may be included in other programs, or may be recorded on a recording medium along with other programs. Instead, the programs may be recorded on multiple recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing method comprising:
   determining whether or not an image displayed on a display unit of an information processing apparatus has been rotated;

changing an operator of the information processing apparatus, when it is determined that the image has been rotated; and changing the image displayed on the display unit of the information processing apparatus on the basis of the operator who has been changed, wherein the changing the operator comprises changing the operator of the information processing apparatus, when it is determined that the image has been rotated and according to a time interval from a time when a predetermined operation of the information processing apparatus is performed to a time when the image is determined to have been rotated.

2. An information processing apparatus comprising at least one hardware processor which implements:

a determination unit that determines whether or not an image displayed on a display unit of the information processing apparatus has been rotated, the information processing apparatus being portable;

an operator change unit that changes an operator of the information processing apparatus, when the determination unit determines that the image has been rotated; and an image change unit that changes the image displayed on the display unit of the information processing apparatus on the basis of the operator who has been changed by the operator change unit, wherein the operator change unit changes the operator of the information processing apparatus, when the determination unit determines that the image has been rotated and according to a time interval from a time when a predetermined operation of the information processing apparatus is performed to a time when the image is determined to have been rotated.

3. The information processing apparatus according to claim 2, wherein the operator change unit changes the operator on the basis of a distance between the information processing apparatus and a communication apparatus carried by the operator, by means of wireless communication.

4. The information processing apparatus according to claim 2, wherein the operator change unit changes the operator by authenticating the operator.

5. The information processing apparatus according to claim 2, wherein the at least one hardware processor further implements:

a detection unit that detects rotation of the information processing apparatus, wherein the operator change unit changes the operator of the information processing apparatus when the detection unit detects rotation of the information processing apparatus or the determination unit detects rotation of the image.

6. An information processing apparatus comprising at least one hardware processor which implements:

a determination unit that determines whether or not an image displayed on a display unit of the information processing apparatus has been rotated, the information processing apparatus being portable;

an operator change unit that changes an operator of the information processing apparatus, when the determination unit determines that the image has been rotated; and an image change unit that changes the image displayed on the display unit of the information processing apparatus on the basis of the operator who has been changed by the operator change unit, wherein the operator change unit changes the operator of the information processing apparatus to a temporary operator authorized to use only an open application of the information processing apparatus, when the determination unit determines that the image has been rotated.

7. The information processing apparatus according to claim 6, wherein the operator change unit changes the operator by authenticating the operator.

8. The information processing apparatus according to claim 6, wherein the at least one hardware processor further implements:

a detection unit that detects rotation of the information processing apparatus, wherein the operator change unit changes the operator of the information processing apparatus when the detection unit detects rotation of the information processing apparatus or the determination unit detects rotation of the image.

9. The information processing apparatus according to claim 6, wherein the operator change unit changes the operator of the information processing apparatus, when the determination unit determines that the image has been rotated and according to a location of the information processing apparatus.

* * * * *